(12) United States Patent
Furuya

(10) Patent No.: US 7,793,766 B2
(45) Date of Patent: Sep. 14, 2010

(54) FRONT FORK

(75) Inventor: Ken Furuya, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 565 days.

(21) Appl. No.: 11/976,365

(22) Filed: Oct. 24, 2007

(65) Prior Publication Data

US 2008/0105505 A1    May 8, 2008

(30) Foreign Application Priority Data

Oct. 27, 2006    (JP) .............................. 2006-291869

(51) Int. Cl.
*F16F 9/24* (2006.01)
(52) U.S. Cl. .................. 188/297; 267/64.26; 267/64.15
(58) Field of Classification Search ................. 188/297, 188/313–315, 282.1, 282.5; 267/64.26, 64.16, 267/64.15, 64.11, 64.22
See application file for complete search history.

(56) References Cited

U.S. PATENT DOCUMENTS

| | | | | |
|---|---|---|---|---|
| 6,568,664 B2 * | 5/2003 | Furuya | .................... | 267/64.26 |
| 6,592,135 B2 * | 7/2003 | Hendrix | .................... | 280/164.1 |
| 7,296,812 B2 * | 11/2007 | Fujita et al. | .................. | 188/297 |
| 2005/0145456 A1 * | 7/2005 | Tomonaga et al. | .......... | 188/297 |
| 2006/0124414 A1 * | 6/2006 | Hanawa | ...................... | 188/314 |
| 2006/0137947 A1 * | 6/2006 | Fujita | .......................... | 188/297 |

FOREIGN PATENT DOCUMENTS

JP    2005-030534    2/2005

* cited by examiner

*Primary Examiner*—Melanie Torres Williams
(74) *Attorney, Agent, or Firm*—Rabin & Berdo, PC

(57) ABSTRACT

The front fork (100) includes a fork main body (3) in which an inner tube (2) is inserted into an outer tube (1) to enable free expansion and contraction, a damper (10) generates a damping force when a rod (5) moves within a cylinder (4) as the fork main body (3) expands and contracts, an air chamber (15) delimited by a free piston (16), which compensates for variation in the internal volume of the cylinder (4) caused by invasion and retreat of the rod (5) into and from the cylinder (4), a pressurizing spring (19) housed in the air chamber (15), which biases the free piston (16) in a direction for enlarging the air chamber (15), and a sub-spring (30) which biases the free piston (16) in a direction for shrinking the air chamber (15) in opposition to the pressurizing spring (19).

5 Claims, 1 Drawing Sheet

FRONT FORK

TECHNICAL FIELD OF THE INVENTION

This invention relates to a front fork and, particularly, to a front fork mounted at a front wheel end of a two-wheeled vehicle to function as a hydraulic shock absorber.

DESCRIPTION OF RELATED ART

As a front fork that is interposed on a front wheel side of a two-wheeled vehicle to absorb road surface vibration input into the front wheel, JP2005-30534 discloses a front fork in which a damper is provided in an axial core portion of a fork main body constituted by a handlebar side tube and a wheel side tube such that a damping force is exhibited by the damper when the fork main body expands and contracts.

In the front fork disclosed in JP2005-30534, a cylinder body is connected to the vehicle body side tube and a rod body is connected to the wheel side tube. A base valve and a free piston are disposed in a rod-opposing side oil chamber of a cylinder body, and the free piston is biased from behind by a pressurizing spring.

The rod-opposing side oil chamber is pressurized by the free piston that receives the biasing force of the pressurizing spring, and therefore, when the fork main body performs a contraction operation from a state of maximum expansion, a predetermined damping force is generated by a compression side damping valve of the base valve from the start of the contraction operation.

SUMMARY OF THE INVENTION

In the front fork disclosed in JP2005-30534, an initial load is applied by the pressurizing spring, and therefore, when the fork main body begins the contraction operation from a state of maximum expansion, the free piston does not retreat until the interior of the cylinder body reaches a predetermined pressure.

Hence, the damper does not perform a contraction operation when the fork main body begins the contraction operation from the state of maximum expansion, and consequently the front fork takes a so-called rod form and does not begin the contraction operation smoothly. As a result, a driver gripping the handlebar encounters a sense of being thrust upward.

This invention has been designed in consideration of this problem, and it is an object thereof to provide a front fork that can improve riding comfort when a fork main body begins a contraction operation from a state of maximum expansion.

In order to achieve above object, this invention provides a front fork interposed between a vehicle body and a wheel to suppress variation in an attitude of the vehicle body. The front fork comprises a fork main body in which an inner tube is inserted into an outer tube to enable free expansion and contraction, a damper disposed in an axial core portion in an interior of the fork main body, which generates a damping force when a rod moves within a cylinder in which a working oil is sealed as the fork main body expands and contracts, an air chamber delimited by a free piston inserted slidably in the cylinder, which compensates for variation in an internal volume of the cylinder caused by invasion and retreat of the rod into and from the cylinder, a pressurizing spring housed in the air chamber, which biases the free piston in a direction for enlarging the air chamber, and a sub-spring which biases the free piston in a direction for shrinking the air chamber in opposition to the pressurizing spring.

PREFERRED EMBODIMENT OF THE INVENTION

Figure 1:
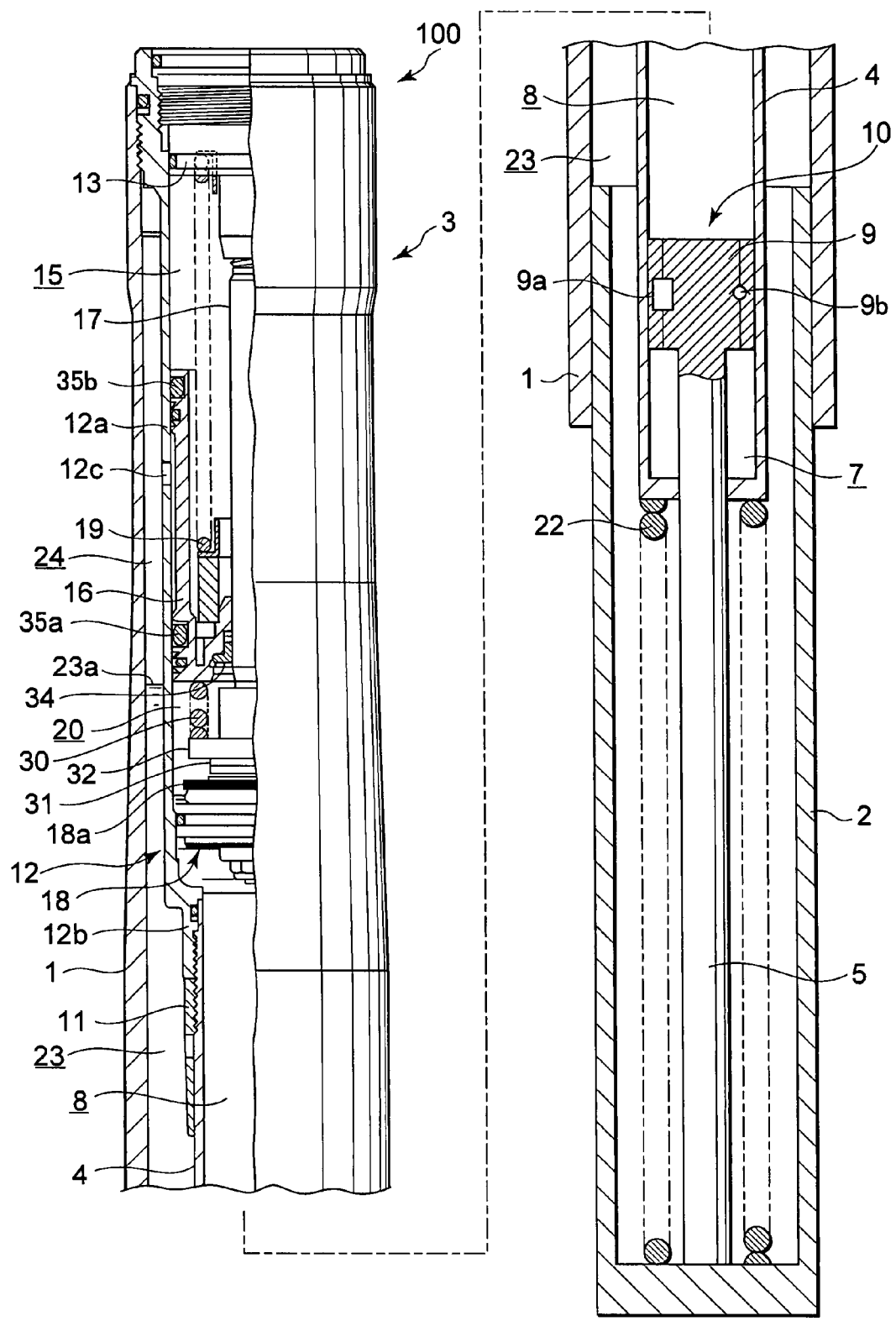
FIG. 1 is a longitudinal sectional view showing a front fork according to an embodiment of this invention.

Referring to FIG. 1, a front fork 100 according to an embodiment of this invention will be described. In FIG. 1, a lower portion side of the front fork 100 shows an outline.

The front fork 100 is interposed between a vehicle body and a wheel of a two-wheeled vehicle, more particularly on a front wheel side of a motorcycle, and functions as a hydraulic shock absorber that absorbs road surface vibration input into the front wheel to suppress variation in the attitude of the vehicle body.

The front fork 100 takes an inverted shape in which a wheel side tube 2 serving as an inner tube is inserted slidably in a vehicle body side tube 1 serving as an outer tube. The vehicle body side tube 1 and wheel side tube 2 constitute a fork main body 3 that can expand and contract freely.

A damper 10 that generates a predetermined damping force as the fork main body 3 expands and contracts is disposed in an axial core portion of the fork main body 3. The damper 10 comprises a cylinder 4 which is coupled to the vehicle body side tube 1 and in which working oil is sealed, and a rod 5 which is coupled to the wheel side tube 2 and moves within the cylinder 4 as the fork main body 3 expands and contracts. Thus, the cylinder 4 is suspended from the axial core portion of the vehicle body side tube 1, and the rod 5 stands upright in the axial core portion of the wheel side tube 2.

A piston 9 that partitions the interior of the cylinder 4 into a rod side oil chamber 7 and a rod-opposing side oil chamber 8 and moves slidingly within the cylinder 4 is connected to a tip end of the rod 5. The piston 9 is provided with an expansion side damping valve 9a that generates a damping force by applying resistance to a flow of working oil from the rod side oil chamber 7 to the rod-opposing side oil chamber 8 when the fork main body 3 performs an expansion operation, and a check valve 9b that allows the working oil to flow from the rod-opposing side oil chamber 8 to the rod side oil chamber 7 when the fork main body 3 performs a contraction operation.

A tubular case portion 12 is connected to an end portion of the rod-opposing side oil chamber 8 in the upper portion of the cylinder 4. The case portion 12 is constituted by a main body portion 12a and a fastening portion 12b having a smaller diameter than the main body portion 12a. The case portion 12 is screwed to an upper end portion of the cylinder 4 via the fastening portion 12b, and an end portion of the main body portion 12a is screwed to an upper end portion of the vehicle body side tube 1. An annular lock nut 11 screwed onto an outer periphery of the cylinder 4 is disposed at a lower end of the fastening portion 12b to maintain the case portion 12 in a fastened state. Further, an open end portion in the upper portion of the main body portion 12a is closed by a cap 13.

A free piston 16 is inserted slidably into the case portion 12. An air chamber 15 that compensates for variation in the internal volume of the cylinder 4 occurring when the rod 5 invades and retreats from the cylinder 4 is delimited between the free piston 16 and the cap 13, or in other words on the rod-opposing side end portion of the cylinder 4.

A guide rod 17 that extends in the axial direction of the fork main body 3 and penetrates the free piston 16 is suspended from the cap 13, and a base valve 18 is connected to a lower end of the guide rod 17.

The base valve 18 is disposed in close contact with the inner peripheral surface of the case portion 12 so as to partition an upper surface of the rod-opposing side oil chamber 8 in the cylinder 4.

The free piston 16 is capable of moving through the interior of the case portion 12 with stability since an outer periphery thereof slides along the inner periphery of the case portion 12 and an inner periphery thereof slides along the outer periphery of the guide rod 17. A seal member 34 is provided on the inner periphery of the free piston 16 to seal the space between the free piston 16 and the outer periphery of the guide rod 17. Further, seal members 35a, 35b are provided at the upper end and lower end of the outer periphery of the free piston 16 to seal the space between the free piston 16 and the inner periphery of the case portion 12.

A pressurizing spring 19 that biases the free piston 16 in a direction for enlarging the air chamber 15 is housed in the air chamber 15 around the outer periphery of the guide rod 17. Thus, the pressurizing spring 19 expands and contracts around the guide rod 17 such that even when the pressurizing spring 19 contracts to a maximum, the contraction occurs with stability and buckling is prevented.

By disposing the base valve 18 in the case portion 12, an oil chamber 20 is delimited between the base valve 18 and the free piston 16. The oil chamber 20 is connected to the rod-opposing side oil chamber 8 via the base valve 18, and allows the working oil in the cylinder 4 to pass, thereby compensating for variation in the volume of the cylinder 4.

The base valve 18 is provided with a compression side damping valve 18a that generates a damping force by applying resistance to a flow of working oil from the rod-opposing side oil chamber 8 to the oil chamber 20 when the fork main body 3 performs a contraction operation, and a check valve (not shown) that allows the working oil to flow from the oil chamber 20 to the rod-opposing side oil chamber 8 when the fork main body 3 performs an expansion operation.

Thus, in the front fork 100, a damping force is generated by the expansion side damping valve 9a provided in the piston 9 when the fork main body 3 performs an expansion operation, and a damping force is generated by the compression side damping valve 18a provided in the base valve 18 when the fork main body 3 performs a contraction operation. Further, a surplus or deficiency of working oil in the cylinder 4 caused by the invasion and retreat of the rod 5 as the fork main body 3 expands and contracts is compensated for by allowing surplus working oil to flow into the oil chamber 20 or replenishing deficient working oil from the oil chamber 20.

A suspension spring 22 is interposed between the cylinder 4 and the wheel side tube 2. The suspension spring 22 is biased in a direction for pushing the wheel side tube 2 out of the vehicle body side tube 1, or in other words a direction for causing the fork main body 3 to expand.

A reservoir chamber 23 is delimited between the inner periphery of the fork main body 3 and the outer periphery of the cylinder 4, and an upper side of the reservoir chamber 23 forms an air chamber 24 having an oil surface 23a as a boundary.

A through hole 12c is formed in the main body portion 12a of the case portion 12. In a normal state, the through hole 12c is blocked by the outer peripheral surface of the free piston 16. However, when the oil temperature of the working oil rises such that the working oil in the cylinder 4 expands, leading to an increase in the internal pressure of the cylinder 4, and the working oil flows from the sliding portion between the cylinder 4 and rod 5 into the cylinder 4 as the damper 10 performs expansion and contraction operations repeatedly, the high pressure causes the free piston 16 to move (rise) to a position where the upper side seal member 35a passes the through hole 12c. As a result, the oil chamber 20 communicates with the reservoir chamber 23 via the through hole 12c, and the high internal pressure of the cylinder 4 is released.

As described above, in a normal state the through hole 12c is blocked by the seal members 35a, 35b of the free piston 16, and therefore the interior of the cylinder 4 is constantly pressurized by the air pressure of the air chamber 15 and the elastic force of the pressurizing spring 19 acting on the free piston 16. Further, the air chamber 15 is provided independently of the air chamber 24, and therefore an air spring force produced by the air chamber 15 acts effectively during the expansion and contraction operations of the fork main body 3.

The cap 13 may be provided with a pressure regulating valve (not shown), and the pressure of the air chamber 15 may be set by supplying and discharging external pressure through the pressure regulating valve. When a pressure regulating valve is used in this manner, the air spring force of the air chamber 15 can be set freely, and therefore the air spring force of the air chamber 15 can be set appropriately in accordance with the specifications of the motorcycle into which the front fork 100 is interposed.

Further, the inner diameter of the case portion 12 is preferably formed such that the sliding portion of the free piston 16 is larger than the applied part of the base valve 18. By forming the case portion 12 in this manner, when the base valve 18 is inserted into the case portion 12 at fabrication process, a seal member provided on the outer periphery of the base valve 18 is not damaged by the through hole 12c.

A sub-spring 30 that biases the free piston 16 in a direction for shrinking the air chamber 15 is housed in the oil chamber 20 between the base valve 18 and the free piston 16. In other words, the sub-spring 30 biases the free piston 16 in opposition to the pressurizing spring 19.

An annular valve stopper 31 and a spring receiving member 32 are fitted into the outer periphery of the guide rod 17 and stacked on the compression side damping valve 18a. The sub-spring 30 is disposed such that one end contacts with the spring receiving member 32, and the other end contacts with the free piston 16.

The biasing force of the sub-spring 30 is set to counterbalance the biasing force of the pressurizing spring 19 on the opposite side of the free piston 16 when the fork main body 3 expands to a maximum, or in other words when the free piston 16 descends to a maximum. Hence, when the fork main body begins a contraction operation from a state of maximum expansion, the free piston 16 rises from a state in which the biasing forces of the pressurizing spring 19 and sub-spring 30 are counterbalanced, and the free piston 16 is encouraged to retreat by the biasing force of the sub-spring 30. As a result, the fork main body 3 begins the contraction operation smoothly.

Further, the sub-spring 30 is set such that an end portion thereof moves away from the free piston 16 when the fork main body 3 reaches a predetermined contraction amount after beginning a contraction operation from a state of maximum expansion. Once the fork main body 3 has contracted to the predetermined contraction amount, the free piston 16 is pressed by the air pressure of the air chamber 15 and the biasing force of the pressurizing spring 19, and therefore the interior of the cylinder 4 is pressurized on the basis of the biasing force set by the pressurizing spring 19.

The embodiment described above exhibits the following actions and effects.

When the fork main body 3 of the front fork 100 is in a state of maximum expansion, the biasing forces of the pressurizing spring 19 and sub-spring 30 are counterbalanced, and the pressing force of the pressurizing spring 19 does not act on the free piston 16. Hence, when the fork main body 3 begins a contraction operation from a state of maximum expansion, the working oil in the rod-opposing side oil chamber 8 is pushed out into the oil chamber 20, enabling the free piston 16 to rise smoothly. Therefore, the fork main body 3 begins the contraction operation smoothly, and a driver gripping the handlebar does not encounter a sense of being thrust upward. As a result, riding comfort when the fork main body 3 begins a contraction operation from a state of maximum expansion is improved.

Furthermore, even when the fork main body 3 is in a state of maximum expansion such that the pressing force of the pressurizing spring 19 does not act on the free piston 16, the working oil in the cylinder 4 is constantly pressurized by the air pressure in the air chamber 15 acting on the free piston 16. Hence, when the fork main body 3 begins a contraction operation from a state of maximum expansion, a predetermined damping force is generated by the compression side damping valve 18a.

Further, when the fork main body 3 reaches the predetermined contraction amount after beginning a contraction operation from a state of maximum expansion, the end portion of the sub-spring 30 moves away from the free piston 16. Thereafter, the working oil in the cylinder 4 is pressed by the air pressure in the air chamber 15 and the biasing force of the pressurizing spring 19, and therefore, the interior of the cylinder 4 is pressurized on the basis of the biasing force set by the pressurizing spring 19, and a predetermined damping force is generated by the compression side damping valve 18a.

The embodiment described above may be modified as follows.

(1) In the embodiment described above, a damping force is generated by the compression side damping valve 18a provided in the base valve 18 when the fork main body 3 performs a contraction operation, and the oil chamber 20 is provided between the base valve 18 and free piston 16 to compensate for a surplus or deficiency of the working oil in the cylinder 4.

Alternatively, the base valve 18 may be omitted, and the piston 9 may be provided with a compression side damping valve. In this case, the free piston 16 separates the rod-opposing side oil chamber 8 from the air chamber 15. Further, the sub-spring 30 is housed between a spring support portion provided on the inner periphery of the cylinder 4 and the free piston 16, for example.

(2) In the embodiment described above, the cylinder 4, in which the piston 9 is disposed, and the case portion 12, in which the base valve 18 and the free piston 16 are disposed, are provided separately. Alternatively, the cylinder 4 and case portion 12 may be formed integrally.

This invention is not limited to the embodiment described above, and may of course be subjected to various modifications within the technical scope thereof.

For example, in the embodiment described above, the front fork 100 is interposed on the front wheel side of a motorcycle, but similar actions and effects are obtained when the front fork 100 is interposed on the front wheel side of a bicycle.

What is claimed is:

1. A front fork interposed between a vehicle body and a wheel to suppress variation in an attitude of the vehicle body, comprising:
   a fork main body in which an inner tube is inserted into an outer tube to enable free expansion and contraction;
   a damper disposed in an axial core portion in an interior of the fork main body, which generates a damping force when a rod moves within a cylinder in which a working oil is sealed as the fork main body expands and contracts;
   an air chamber delimited by a free piston inserted slidably in the cylinder, which compensates for variation in an internal volume of the cylinder caused by invasion and retreat of the rod into and from the cylinder;
   a pressurizing spring housed in the air chamber, which biases the free piston in a direction for enlarging the air chamber; and
   a sub-spring which biases the free piston in a direction for shrinking the air chamber in opposition to the pressurizing spring.

2. The front fork according to claim 1, wherein a biasing force of the sub-spring is set to counterbalance a biasing force of the pressurizing spring on an opposite side of the free piston when the fork main body expands to a maximum.

3. The front fork according to claim 2, wherein when the fork main body reaches a predetermined contraction amount after beginning a contraction operation from a state of maximum expansion, an end portion of the sub-spring moves away from the free piston.

4. The front fork according to claim 1, wherein the outer tube is attached to the vehicle body side and the inner tube is attached to the wheel side,
   the cylinder is coupled to the outer tube and the rod is coupled to the inner tube,
   the front fork further comprises:
   a base valve disposed on a rod-opposing side of the cylinder, which generates a damping force when the fork main body contracts; and
   an oil chamber delimited between the base valve and the free piston and connected to a rod-opposing side oil chamber of the cylinder via the base valve, which compensates for a surplus or deficiency of the working oil in the cylinder, and
   the sub-spring is housed in the oil chamber.

5. The front fork according to claim 4, wherein a reservoir chamber having an air chamber is delimited between an inner periphery of the fork main body and an outer periphery of the cylinder, and
   a through hole which allows the oil chamber to communicate with the reservoir chamber when the free piston moves to a retreat limit is formed in the cylinder.

* * * * *